United States Patent
Catherineau et al.

(10) Patent No.: US 12,083,781 B2
(45) Date of Patent: Sep. 10, 2024

(54) METHOD FOR MAKING A COMPOSITE PANEL AND COMPOSITE PANEL OBTAINED BY SAID METHOD

(71) Applicant: CATH'AIR, Saint Medard en Jalles (FR)

(72) Inventors: Marie Catherineau, Bordeaux (FR); Anne-Sophie Catherineau, Le Pian-Medoc (FR)

(73) Assignee: CATH'AIR (FR)

( * ) Notice: Subject to any disclaimer, the term of this patent is extended or adjusted under 35 U.S.C. 154(b) by 371 days.

(21) Appl. No.: 16/441,412

(22) Filed: Jun. 14, 2019

(65) Prior Publication Data
US 2019/0381777 A1 Dec. 19, 2019

(30) Foreign Application Priority Data
Jun. 14, 2018 (FR) .................................... 1855230

(51) Int. Cl.
*B32B 37/06* (2006.01)
*B32B 3/12* (2006.01)
(Continued)

(52) U.S. Cl.
CPC ................ *B32B 37/06* (2013.01); *B32B 3/12* (2013.01); *B32B 5/12* (2013.01); *B32B 5/18* (2013.01);
(Continued)

(58) Field of Classification Search
CPC ....... B32B 21/00; B32B 21/04; B32B 21/042; B32B 21/10; B32B 21/14; B32B 37/06;
(Continued)

(56) References Cited

U.S. PATENT DOCUMENTS 4,461,796 A * 7/1984 Fukahori ............. B29D 24/005
428/116
4,533,589 A * 8/1985 Sewell .................... B32B 21/08
428/174
(Continued)

FOREIGN PATENT DOCUMENTS

DE 102013214391 1/2015
EP 1872933 A1 * 1/2008 ............. E04C 2/365
(Continued)

OTHER PUBLICATIONS

Machine translation of FR 2962362 date unknown.*
(Continued)

*Primary Examiner* — John L Goff, II
(74) *Attorney, Agent, or Firm* — Perman & Green, LLP

(57) ABSTRACT

A method for producing a composite panel, in particular intended for aircraft or nautical furniture. The composite panel comprising including a central core formed from a core of the low-density structured material type covered on its two faces with at least one layer of material preimpregnated with resin, with at least one of the faces of the panel being covered with a cladding. The method including the following two manufacturing steps: baking of the cladding with an adhesive film, the adhesive film being glued onto one of the faces of the cladding; and baking of the cladding and of the adhesive film on the at least one layer of material preimpregnated with resin. A composite panel obtained by the method is also provided.

24 Claims, 2 Drawing Sheets

(51) Int. Cl.
- *B32B 5/12* (2006.01)
- *B32B 5/18* (2006.01)
- *B32B 5/24* (2006.01)
- *B32B 7/12* (2006.01)
- *B32B 15/10* (2006.01)
- *B32B 15/14* (2006.01)
- *B32B 15/20* (2006.01)
- *B32B 21/10* (2006.01)
- *B32B 27/12* (2006.01)
- *B32B 37/10* (2006.01)
- *B32B 37/12* (2006.01)

(52) U.S. Cl.
CPC ............... *B32B 5/245* (2013.01); *B32B 7/12* (2013.01); *B32B 15/10* (2013.01); *B32B 15/14* (2013.01); *B32B 15/20* (2013.01); *B32B 21/10* (2013.01); *B32B 27/12* (2013.01); *B32B 37/10* (2013.01); *B32B 37/12* (2013.01); *B32B 2250/05* (2013.01); *B32B 2250/40* (2013.01); *B32B 2307/72* (2013.01); *B32B 2307/732* (2013.01); *B32B 2479/00* (2013.01); *B32B 2605/18* (2013.01)

(58) Field of Classification Search
CPC ..... B32B 37/10; B32B 37/12; B32B 2479/00; B32B 2605/18
See application file for complete search history.

(56) References Cited

U.S. PATENT DOCUMENTS

| | | | | |
|---|---|---|---|---|
| 4,890,656 | A | * | 1/1990 | Ohsumi ................... B27M 3/18 144/348 |
| 2005/0089644 | A1 | * | 4/2005 | Oldorff ..................... B05D 7/06 427/393 |
| 2007/0275247 | A1 | * | 11/2007 | Stephan ................... B32B 5/28 428/411.1 |
| 2014/0234632 | A1 | * | 8/2014 | Nolte ..................... C09K 21/12 428/413 |

FOREIGN PATENT DOCUMENTS

| | | |
|---|---|---|
| FR | 2563153 | 10/1985 |
| FR | 2872085 | 12/2005 |
| FR | 2962362 | 1/2012 |

OTHER PUBLICATIONS

Machine translation of EP 1872933 date unknown.*
Partial Preliminary Search Report dated Mar. 11, 2019 for French Application No. 1855230.

* cited by examiner

METHOD FOR MAKING A COMPOSITE PANEL AND COMPOSITE PANEL OBTAINED BY SAID METHOD

CROSS REFERENCE TO RELATED APPLICATIONS

This application claims priority to and the benefit of French Application No. 1855230, filed 14 Jun. 2018, the disclosure of which is incorporated herein by reference in its entirety.

BACKGROUND

1. Field

The disclosed embodiment relates to the field of composite panels, in particular intended for aircraft or nautical furniture.

The disclosed embodiment relates more particularly to a method for producing a composite panel, and a composite panel obtained by said method.

2. Brief Description of Related Developments

Composite panels are now commonly used for aircraft furniture or nautical furniture.

Known in particular in prior art is French patent No. FR 2 563 153 B1, which relates to a composite panel, in particular intended for aircraft furniture. The object of this invention of prior art is a composite panel comprising a central core formed from a panel of the honeycomb type covered on its two faces with at least one layer of fabric preimpregnated with a suitable resin, wherein at least one of the faces of said panel thus covered is covered with a thin wood cladding set in place via simple hot pressing, with the central core+fabrics+cladding assembly being assembled and made integral during a single and same operation.

Also known in particular in prior art is French patent No. FR 2 872 085 B1, which relates to a composite panel for aircraft furniture. The object of this invention of prior art is a composite panel, in particular intended for aircraft furniture, comprising a central core formed from a panel of the honeycomb type covered on its two faces with at least one layer of fabric preimpregnated with a suitable resin, with at least one of the faces of said panel being covered with a thin wood cladding, wherein, between said thin wood cladding and said layer of preimpregnated fabric are inserted a layer of a foam of rigid plastic material and a second layer of fabric preimpregnated with resin, with the layer of foam being inserted between the two layers of fabric, with the assembly being assembled and made integral hot and under pressure during a single and same operation.

Also known in particular in prior art is French patent No. FR 2 962 362 B1, which relates to a composite panel for aircraft furniture. The object of this invention of prior art is a composite panel, in particular intended for aircraft furniture, comprising a central core formed from a panel of the honeycomb type covered on its two faces with at least one layer of fabric preimpregnated with a suitable resin, with at least one of the two faces of said panel being covered with a thin wood cladding, with the assembly being assembled and made integral hot and under pressure during a single and same operation. According to this invention of prior art, between said thin wood cladding and said layer of preimpregnated fabric is inserted an aluminum film, said aluminum film being made integral on one of the faces of said wooden cladding by means of a layer of adhesive.

For certain types of porous cladding, risings of resin from the preimpregnated fabric can appear on the visible face of the cladding during the baking in a single step described in patent No. FR 2 563 153 B1.

SUMMARY

The disclosed embodiment intends to overcome the disadvantages of prior art by proposing a method for producing a composite panel, in particular intended for aircraft or nautical furniture, making it possible to create a sealed barrier on the face in contact with the material preimpregnated with resin, while still minimizing the impact on the mass of the composite panel and by providing better gluing of the cladding onto the panel.

To this effect, the disclosed embodiment relates to, in its most general sense, a method for producing a composite panel, in particular intended for aircraft or nautical furniture, said composite panel comprising a central core formed from a core of the low-density structured material type covered on its two faces with at least one layer of material preimpregnated with resin, with at least one of the faces of said panel being covered with a cladding, comprising the following two manufacturing steps:
- baking of said cladding with an adhesive film, said adhesive film being glued onto one of the faces of said cladding; and
- baking of said cladding and of the adhesive film on said at least one layer of material preimpregnated with resin.

The method according to the disclosed embodiment creates a sealed barrier on the face in contact with the material preimpregnated with resin so as to prevent the risings of resin on claddings.

The method according to the disclosed embodiment provides better adhesion of the cladding onto the sandwich by the adding of an adhesive film which participates in the resistance of the cladding on the composite panel.

The method according to the disclosed embodiment minimizes the impact on the mass of the composite panel by adding only an adhesive film on either side of the composite panel.

It allows for a gain in weight of 30% in relation to the conventional manufactures when the decorative assembly of layers of cladding is added cold with neoprene gluing in a second step.

According to one of the alternatives of the disclosed embodiment, the adding of aluminum between two adhesive films in the composite panel improves the rigidity of the composite panel and its resistance to fire.

The method object of the disclosed embodiment produces structure panels and decorative panels.

Advantageously, the gluing of said adhesive film is carried out via hot pressing onto one of the faces of said cladding.

According to an aspect of the disclosed embodiment, said low-density structured material is of the honeycomb type.

According to another aspect of the disclosed embodiment, said low-density structured material is of the foam type.

According to an aspect of the disclosed embodiment, the step of baking of said cladding with said adhesive film is carried out at a temperature between 110° ° C. and 165° C.

According to a particular aspect of the disclosed embodiment, the step of baking of said cladding with said adhesive film is carried out at a temperature between 110° C. and 140° C.

According to an aspect of the disclosed embodiment, the step of baking of said cladding with said adhesive film is of a duration between 20 seconds and 30 minutes.

According to a particular aspect of the disclosed embodiment, the step of baking of said cladding with said adhesive film is of a duration between 2 minutes and 10 minutes.

According to an aspect of the disclosed embodiment, the step of baking of said cladding with said adhesive film is carried out in a hot compression press under a pressure between 12 and 25 bar.

According to an aspect of the disclosed embodiment, the step of baking of said cladding and of the adhesive film on said at least one layer of material preimpregnated with resin is carried out at a temperature between 100° ° C. and 150° C.

According to a particular aspect of the disclosed embodiment, the step of baking of said cladding and of the adhesive film on said at least one layer of material preimpregnated with resin is carried out at a temperature between 125° ° C. and 135° C.

According to an aspect of the disclosed embodiment, the step of baking of said cladding and of the adhesive film on said at least one layer of material preimpregnated with resin is of a duration between 20 and 360 minutes.

According to a particular aspect of the disclosed embodiment, the step of baking of said cladding and of the adhesive film on said at least one layer of material preimpregnated with resin is of a duration between 90 and 120 minutes.

According to an aspect of the disclosed embodiment, the step of baking of said cladding and of the adhesive film on said at least one layer of material preimpregnated with resin is carried out in a hot compression press under a pressure between 0.3 and 5 bar.

According to another aspect of the disclosed embodiment, the step of baking of said cladding and of the adhesive film on said at least one layer of material preimpregnated with resin is carried out in an oven.

According to another aspect of the disclosed embodiment, the step of baking of said cladding and of the adhesive film on said at least one layer of material preimpregnated with resin is carried out in an autoclave.

According to an aspect of the disclosed embodiment, said cladding is made of wood with a thickness of a few tenths of a millimeter.

Preferably, said cladding made of wood is of a thickness between 0.4 mm and 1 mm.

According to an aspect of the disclosed embodiment, between said cladding and said layer of preimpregnated material is inserted an aluminum film with a thickness of a few tenths of a millimeter.

Preferably, said aluminum film is of a thickness between 0.05 mm and 0.2 mm.

According to an alternative, said method comprises furthermore a step of adding a flame retardant impregnating agent.

According to an aspect of the disclosed embodiment, said layer of preimpregnated material is comprises of fabrics.

According to another aspect of the disclosed embodiment, said layer of preimpregnated material is comprised of unidirectional sheets.

Advantageously, said layer of preimpregnated material is comprised of fibers of the type in the following group: glass, hybrids, carbon, aramid, linen, bamboo and hemp.

The disclosed embodiment also relates to a composite panel, in particular intended for aircraft or nautical furniture, obtained by implementing the method mentioned hereinabove.

According to an aspect of the disclosed embodiment, said composite panel is flat.

According to another aspect of the disclosed embodiment, said composite panel is in a form.

BRIEF DESCRIPTION OF THE FIGURES

The disclosed embodiment will be understood better using the description, given hereinafter solely for the purposes of explanation, of aspects of the disclosed embodiment, in reference to the Figures wherein.

DETAILED DESCRIPTION

Figure 1:
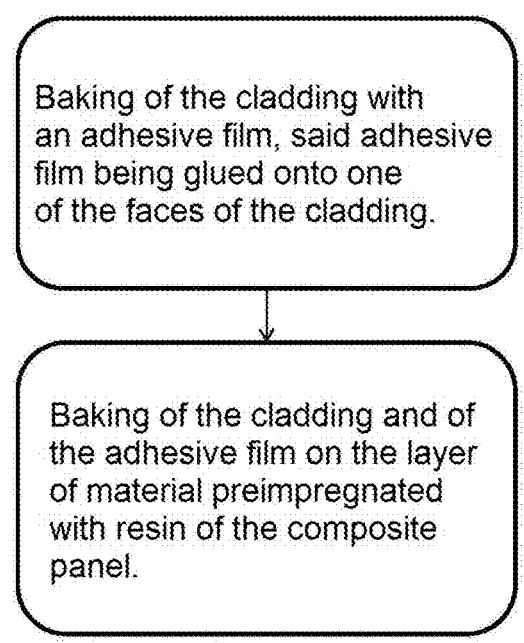
FIG. 1 shows the method according to the disclosed embodiment.

The disclosed embodiment relates to a method for producing a composite panel 10, in particular intended for aircraft or nautical furniture, said composite panel 10 comprising a central core 11 formed from a core 12 of the low-density structured material type covered on its two faces with at least one layer 13 of material preimpregnated with resin, with at least one of the faces of said panel 10 being covered with a cladding 14. The method according to the disclosed embodiment comprises the following two manufacturing steps:

baking of said cladding 14 with an adhesive film 15, said adhesive film 15 being glued onto one of the faces of said cladding 14; and baking of said cladding 14 and of the adhesive film 15 on said at least one layer 13 of material preimpregnated with resin.

FIG. 1 shows the various steps of the method according to the disclosed embodiment.

Figure 2:
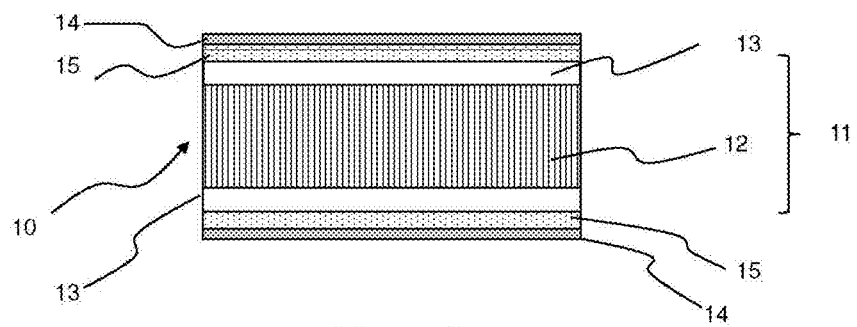
FIG. 2 shows a composite panel obtained by implementing the method according to the disclosed embodiment.

FIG. 2 shows a composite panel 10 obtained by implementing the method according to the disclosed embodiment.

On observe in FIG. 2 a composite panel 10 comprising a central core 11 formed from a core 12 of the low-density structured material type covered on its two faces with at least one layer 13 of material preimpregnated with resin, with at least one of the faces of said panel 10 being covered with a cladding 14. On observe also in FIG. 2 an adhesive film 15, said adhesive film 15 being glued onto one of the faces of said cladding 14.

Figure 3:
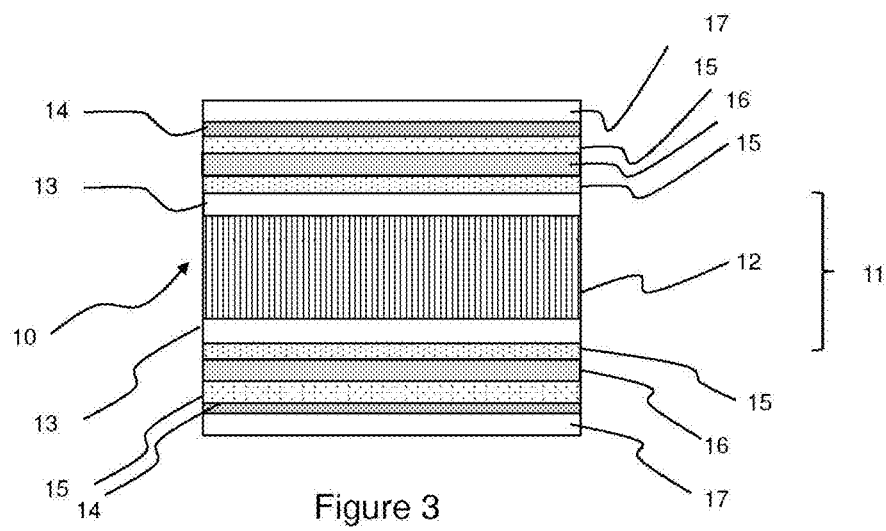
FIG. 3 shows an alternative of the composite panel obtained by implementing the method according to the disclosed embodiment.

FIG. 3 shows an alternative of the composite panel obtained by implementing the method according to the disclosed embodiment.

On observe in FIG. 3 a composite panel 10 comprising a central core 11 formed from a core 12 of the low-density structured material type covered on its two faces with at least one layer 13 of material preimpregnated with resin, with at least one of the faces of said panel 10 being covered with a cladding 14. On observe also in FIG. 3 an adhesive film 15, said adhesive film 15 being glued onto one of the faces of said cladding 14. In addition, in the composite panel 10 shown in FIG. 3, an aluminum film 16 is inserted between said cladding 14 and said layer 13 of preimpregnated material. A flame retardant impregnating agent 17 is also shown in FIG. 3.

The method according to the disclosed embodiment creates a sealed barrier on the face in contact with the material preimpregnated with resin so as to prevent the risings of resin on claddings.

The method according to the disclosed embodiment also provides better gluing of the cladding on the sandwich.

The method object of the disclosed embodiment produces structure panels and decorative panels.

In an aspect of the disclosed embodiment, the gluing of said adhesive film 15 onto one of the faces of said cladding 14 is carried out via hot pressing.

The low-density structured material can be of the honeycomb type, or of the foam type.

The step of baking of said cladding 14 with the adhesive film 15 is carried out at a temperature between 110° ° C. and 165° ° C., preferably between 110° C. and 140° C., and is of a duration between 20 seconds and 30 minutes, preferably between 2 and 10 minutes.

In an aspect of the disclosed embodiment, the step of baking of said cladding 14 with said adhesive film 15 is carried out in a hot compression press under a pressure between 12 and 25 bar.

The step of baking of said cladding 14 and of the adhesive film 15 on said at least one layer 13 of material preimpregnated with resin is carried out at a temperature between 100° ° C. and 150° C., preferably between 125° ° C. and 135° ° C. and is of a duration between 20 and 360 minutes, preferably between 90 and 120 minutes.

This step of baking is carried out either in a hot compression press under a pressure between 0.3 and 5 bar, or in an oven, or in an autoclave.

The cladding 14 is made of wood with a thickness of a few tenths of a millimeter, preferably between 0.4 mm and 1 mm.

In an aspect of the disclosed embodiment, between said cladding 14 and said layer 13 of preimpregnated material is inserted an aluminum film 16 with a thickness of a few tenths of a millimeter, preferably between 0.05 mm and 0.2 mm.

In an advantageous aspect of the disclosed embodiment, said method comprises furthermore a step of adding a flame retardant impregnating agent 17.

The layer 13 of preimpregnated material is comprised either of fabrics, or of unidirectional sheets.

The layer 13 of preimpregnated material is comprised of fibers of the type in the following group: glass, hybrids, carbon, aramid, linen, bamboo and hemp.

The disclosed embodiment also relates to a composite panel 10, in particular intended for aircraft or nautical furniture, obtained by implementing the method mentioned hereinabove, said composite panel 10 comprising a central core 11 formed from a core 12 of the low-density structured material type covered on its two faces with at least one layer 13 of material preimpregnated with resin, with at least one of the faces of said panel 10 being covered with a cladding 14.

The composite panel 10 is either flat, or in a form.

The disclosed embodiment is described hereinabove by way of example. It is understood that those skilled in the art are able to realize different alternatives of the disclosed embodiment without however leaving the scope of the patent.

What is claimed is:

1. A method for producing a composite panel, in particular intended for aircraft or nautical furniture, said composite panel comprising a central core formed from a core of a low-density structured material type covered on its two faces with at least one layer of material preimpregnated with resin, with at least one of the faces of said panel being covered with a cladding, the method comprises the following two manufacturing steps conducted separately:

baking of said cladding with an adhesive film, said adhesive film being glued onto one of the faces of said cladding so the baked cladding and adhesive film effect a sealed barrier on the one of the faces of said cladding, the sealed barrier sealing the cladding from penetration of resin into the cladding; and then baking of said cladding and of the adhesive film on said at least one layer of material preimpregnated with resin, wherein the sealed barrier seals the cladding during then baking to prevent penetration of resin into the cladding.

2. The method for producing a composite panel according to claim 1, wherein the gluing of said adhesive film onto one of the faces of said cladding is carried out via hot pressing.

3. The method for producing a composite panel according to claim 1, wherein said low-density structured material is of the honeycomb type.

4. The method for producing a composite panel according to claim 1, wherein said low-density structured material is of the foam type.

5. The method for producing a composite panel according to claim 1, wherein the step of baking of said cladding with said adhesive film is carried out at a temperature between 110° C. and 165° C.

6. The method for producing a composite panel according to claim 5, wherein the step of baking of said cladding with said adhesive film is carried out at a temperature between 110° C. and 140° ° C.

7. The method for producing a composite panel according to claim 1, wherein the step of baking of said cladding with said adhesive film is of a duration between 20 seconds and 30 minutes.

8. The method for producing a composite panel according to claim 7, wherein the step of baking of said cladding with said adhesive film is of a duration between 2 minutes and 10 minutes.

9. The method for producing a composite panel according to claim 1, wherein the step of baking of said cladding with said adhesive film is carried out in a hot compression press under a pressure between 12 and 25 bar.

10. The method for producing a composite panel according to claim 1, wherein the step of baking of said cladding and of the adhesive film on said at least one layer of material preimpregnated with resin is carried out at a temperature between 100° C. and 150° C.

11. The method for producing a composite panel according to claim 10, wherein the step of baking of said cladding and of the adhesive film on said at least one layer of material preimpregnated with resin is carried out at a temperature between 125° C. and 135° C.

12. The method for producing a composite panel according to claim 1, wherein the step of baking of said cladding and of the adhesive film on said at least one layer of material preimpregnated with resin is of a duration between 20 and 360 minutes.

13. The method for producing a composite panel according to claim 12, wherein the step of baking of said cladding and of the adhesive film on said at least one layer of material preimpregnated with resin is of a duration between 90 and 120 minutes.

14. The method for producing a composite panel according to claim 1, wherein the step of baking of said cladding and of the adhesive film on said at least one layer of material preimpregnated with resin is carried out in a hot compression press under a pressure between 0.3 and 5 bar.

15. The method for producing a composite panel according to claim 1, wherein the step of baking of said cladding and of the adhesive film on said at least one layer of material preimpregnated with resin is carried out in an oven.

16. The method for producing a composite panel according to claim 1, wherein the step of baking of said cladding and of the adhesive film on said at least one layer of material preimpregnated with resin is carried out in an autoclave.

17. The method for producing a composite panel according to claim 1, wherein said cladding is made of wood with a thickness of a few tenths of a millimeter.

18. The method for producing a composite panel according to claim 17, wherein said cladding made of wood is of a thickness between 0.4 mm and 1 mm.

19. The method for producing a composite panel according to claim 1, wherein between said cladding and said at least one layer of preimpregnated material is inserted an aluminum film with a thickness of a few tenths of a millimeter.

20. The method for producing a composite panel according to claim 19, wherein said aluminum film is of a thickness between 0.05 mm and 0.2 mm.

21. The method for producing a composite panel according to claim 1, wherein it further comprises the step of adding a flame retardant impregnating agent.

22. The method for producing a composite panel according to claim 1, wherein said at least one layer of preimpregnated material is comprised of fabrics.

23. The method for producing a composite panel according to claim 1, wherein said at least one layer of preimpregnated material is comprised of unidirectional sheets.

24. The method for producing a composite panel according to claim 1, wherein said at least one layer of preimpregnated material is comprised of fibers of a type in the following group: glass, hybrids, carbon, aramid, linen, bamboo and hemp.

* * * * *